(No Model.)
W. W. DONALDSON & R. MACRAE.
SECONDARY BATTERY ELECTRODE.
No. 494,062. Patented Mar. 21, 1893.
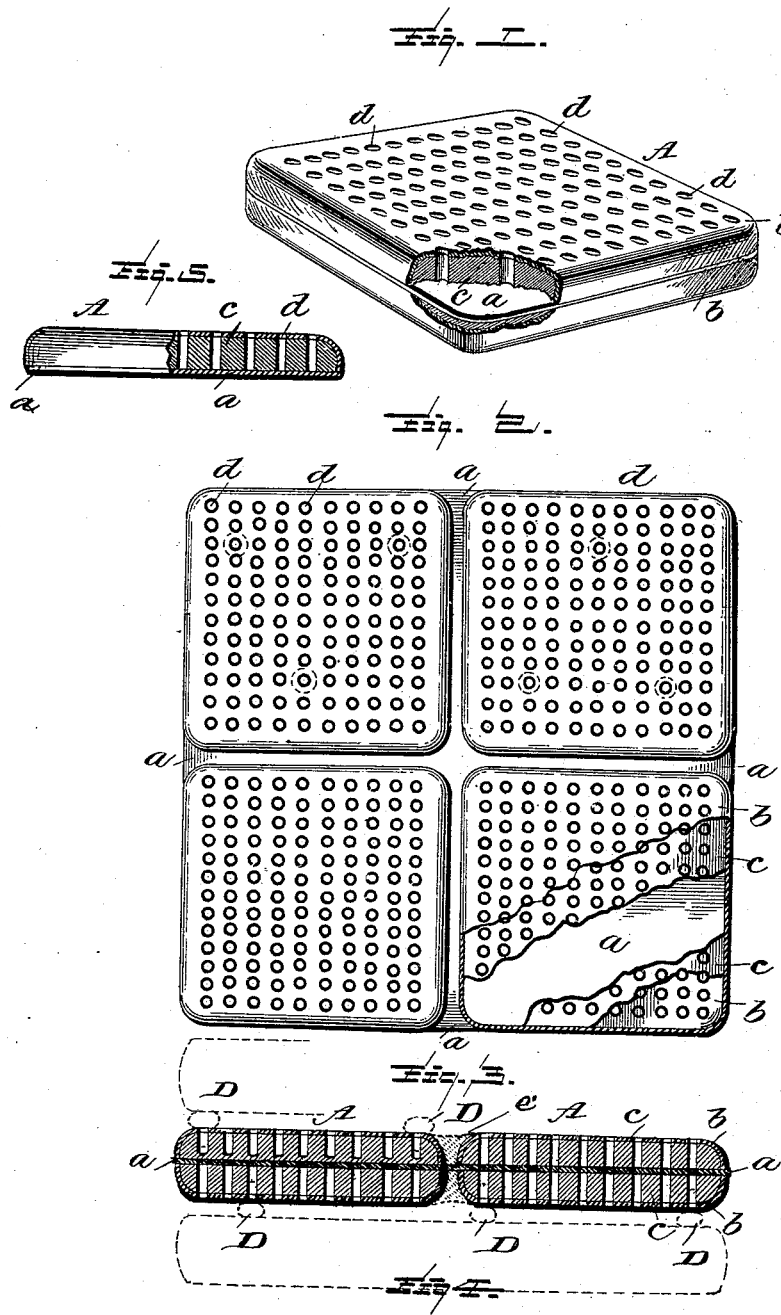
Witnesses
L. C. Hills.
E. H. Bond.
Inventors
William W. Donaldson.
and Roderick Macrae
By E. B. Stocking Attorney

UNITED STATES PATENT OFFICE.

WILLIAM W. DONALDSON AND RODERICK MACRAE, OF BALTIMORE, MARYLAND.

SECONDARY-BATTERY ELECTRODE.

SPECIFICATION forming part of Letters Patent No. 494,062, dated March 21, 1893.

Application filed March 4, 1892. Serial No. 423,767. (No model.)

*To all whom it may concern:*

Be it known that we, WILLIAM W. DONALDSON and RODERICK MACRAE, citizens of the United States, residing in the city of Baltimore, in the State of Maryland, have invented certain new and useful Improvements in Battery-Plates, of which the following is a specification, reference being had therein to the accompanying drawings.

This invention relates to certain new and useful improvements in battery plates and it has for its objects among others the production of a battery plate in which the inactive material employed will not be forced away from the active material so as to cause bulging or breakage of the plate, and the production of a plate made up of a series of small plates sweated or otherwise connected together in such a manner and order as to produce finally a plate of any desired dimensions in width or length; and the production of a plate that has a superficial area of any extent whatever and that at the same time will not be subject to bulging or breakage of the material which contains the active material.

Other objects and advantages of the invention will hereinafter appear and the novel features thereof will be specifically defined by the appended claims.

To attain the objects above specified we construct a battery plate by the employment of a diaphragm and a cup-like section mounted thereon between which diaphragm and section is contained the active material which together with the section is perforated to give access to the active material of the exciting liquid employed. We may apply a section to each side of the part designated as a diaphragm. We then unite several of these sectional plates to each other in any suitable manner and by any suitable means and thus constitute a battery plate in which the active material is confined by reduced portions of inactive material whereby the latter possesses sufficient strength even when the material is very thin to prevent buckling, bulging or breaking. In this manner we materially reduce the proportionate weight and expense of the inactive to that of the active material in a plate and the resulting advantage of increased capacity in proportion to weight.

In the present illustration of our invention we have shown a plate made up of sections joined edge to edge and in pairs, but it is apparent that they may be joined in triplets or so as to produce a plate having two or more sections in length or in width in accordance with the desire as to the dimensions and proportions of the plate to be constructed of said sections. We have also devised a simple but very effective means for spacing a series of plates in a battery and it consists in a spacing block of insulating material having a stud projecting therefrom and adapted to be inserted into any of the apertures of a section embodied in a plate.

Instead of taking as many diaphragms as we employ sections we may take a single diaphragm of the required size and shape and unite the required number of sections thereto.

The invention is clearly illustrated in the accompanying drawings, which, with the letters of reference marked thereon, form a part of this specification, and in which—

Figure 1 is a perspective view of one of the sections or parts, with a portion broken away. Fig. 2 is a side view of a complete plate with the diaphragms sweated together with portions broken away. Fig. 3 is a cross section, of the plate shown in Fig. 2, showing a modification in dotted lines, a filling of solder connecting the sections. Fig. 4 is a perspective view of one of the spacers. Fig. 5 is a view partly in side elevation and partly in section of a single plate or section.

Like letters of reference indicate like parts throughout the several views in which they appear.

Referring now to the details of the drawings by letter, A designates one of the sections, plates, or parts; it is composed of the diaphragm $a$, preferably of lead the outer cup $b$, preferably of lead, and the filling $c$ of active material. The section is formed by first forming one half, that is, one cup and its filling in any suitable manner, such for instance as is set forth in our application Serial No. 402,500, filed August 13, 1891, and the cup and filling perforated. The cup and the active material are provided with perforations $d$, but the diaphragm is imperforate. The perforations may extend to the diaphragm, but they preferably stop short thereof as seen upon the upper side at the left of Fig. 3. The cup and its filling may be united to the diaphragm in any suitable manner, as for instance by sweating. The diaphragm may have a cup and filling upon only one side or upon both sides, as shown in Fig. 5.

In building up the battery plate from sections constructed as above set forth, the sections or parts may be placed side by side as seen in Fig. 2 to form a substantially square plate, or they may be arranged in other forms according to the desired shape of the desired completed plate. This manner of constructing battery plates permits of varied arrangements as may be desired. The sections, or plates, or parts are joined together in any suitable manner. They may be united by solder as seen at $e'$ in Fig. 3, or by sweating the edges of the diaphragms, as seen in Fig. 2.

We may, instead of providing each section or part with a diaphragm, take a single diaphragm of the desired size and shape and construct the sections or parts and unite them to the said single diaphragm, but the complete sections or parts sweated together are preferred.

When several of the plates are to be built up or arranged in series as indicated by dotted lines in Fig. 3 it is desirable to provide some means for spacing them; we employ a spacing block D having a shank or projecting stud $D'$ adapted to be inserted into any of the perforations in the cups and fillings of the sections, as indicated in Fig. 3 by dotted lines.

Modifications in detail may be resorted to without departing from the spirit of the invention or detracting from its merits.

The preferred method of uniting the sections is by burning the lead by means of oxyhydrogen flame so as to melt it and thus allow the adjacent edges of the sections to run together either at desired points, as at the corners, or continuously along the line of contact, and while the terms "sweating" and "solder" have been used they are to be understood as meaning such a uniting of the sections as will not be affected by the liquid employed in the battery. The "solder" should be preferably pure lead, rather than a combination of metals.

What we claim is—

1. A battery-plate section made up of a diaphragm, a cup and an interposed filling of active material, the diaphragm being imperforate and the cup and filling perforated, as set forth.

2. A battery plate made up of sections each with a diaphragm and united together with their diaphragms in juxtaposition, as set forth.

3. A battery plate made up of sections each with a diaphragm and complete in itself with their diaphragms in juxtaposition in the same plane, as set forth.

4. A battery plate made up of sections each with a diaphragm and complete in itself and united together with their diaphragms in juxtaposition in the same plane, as set forth.

5. A battery plate made up of a series of sections each having a diaphragm, said sections being united to each other at the edges of the diaphragms, substantially as specified.

6. A battery plate made up of sections, each complete in itself with a diaphragm, a cup and interposed active material and arranged to form a plate of the desired size and shape with the diaphragms united together in the same plane as set forth.

7. A battery-plate section composed of a diaphragm, a cup and interposed active material, the cup and active material being provided with perforations, of greater or less depth as set forth.

In testimony whereof we affix our signatures in presence of two witnesses.

WILLIAM W. DONALDSON.
RODERICK MACRAE.

Witnesses:
 CHARLES J. TRAGESER,
 CHARLES G. BROOKS.